United States Patent [19]

Gutstein et al.

[11] Patent Number: 5,410,981
[45] Date of Patent: May 2, 1995

[54] ANCHORING KIT FOR USE WITH A FLOTATION DEVICE

[76] Inventors: Jacqueline Gutstein, 11021 NW. 7th St., Apt. 201, Miami, Fla. 33172; Omayra Leon, 255 W. 32 St., Hialeah, Fla. 33012

[21] Appl. No.: 190,854

[22] Filed: Feb. 3, 1994

[51] Int. Cl.⁶ .............................................. B63B 21/24
[52] U.S. Cl. .................................................... 114/294
[58] Field of Search ............... 441/1, 23, 24, 75, 229; 114/230, 294; 472/13, 128, 129; 482/55

[56] References Cited

U.S. PATENT DOCUMENTS

| | | | |
|---|---|---|---|
| 4,622,724 | 11/1986 | Dupre | 24/115 H |
| 4,913,672 | 4/1990 | Martin | 114/294 |
| 5,244,393 | 9/1993 | Perry | 482/55 |

*Primary Examiner*—Jesus D. Sotelo
*Attorney, Agent, or Firm*—Robert M. Downey

[57] ABSTRACT

An anchoring kit for use in combination with a flotation device and including an anchor having an outer casing with a dense granular filling therein, an anchor line having a first end attached to the anchor and a second free end, a hook slidably fitted to the anchor line being selectively adjustable along a length thereof relative to the first and second ends, and a body attachment device structured for interconnection between a user's limb and the hook, facilitating attachment of the anchoring kit to the user while lying on the flotation device. A catch is provided on the hook for locking the hook at a selected, fixed position along the anchor line, thereby enabling controlled adjustment of the length of anchor line between the hook and the anchor.

11 Claims, 1 Drawing Sheet

U.S. Patent     May 2, 1995     5,410,981
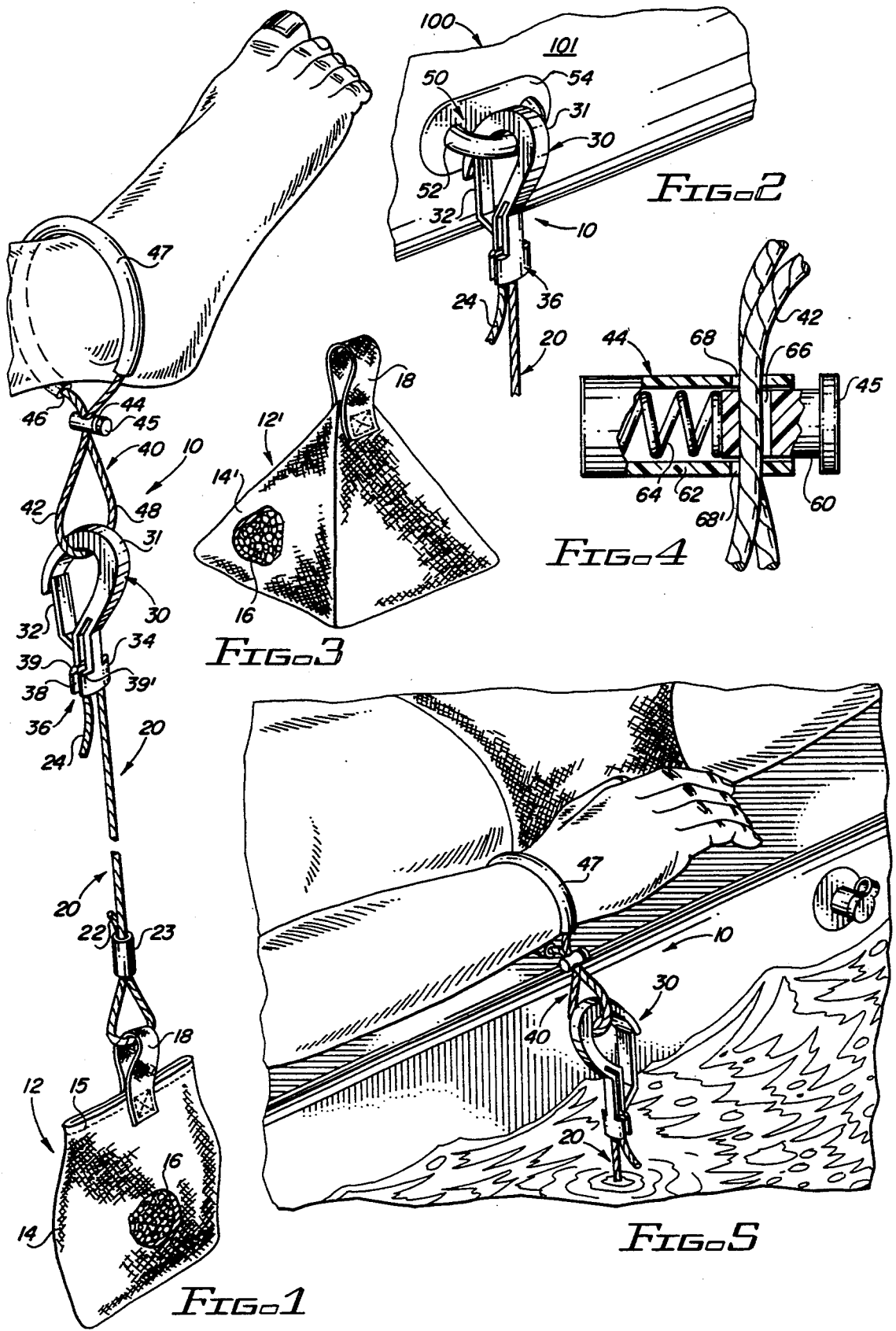

ANCHORING KIT FOR USE WITH A FLOTATION DEVICE

BACKGROUND OF THE INVENTION

1. Field of the Invention

The present invention relates generally to an anchoring apparatus for use with flotation devices, and more particularly to an anchoring kit for use with an existing inflatable air mattress or raft, and including an anchor, an anchor line, a hook and means to attach the hook, along with the anchor and anchor line, to either the air mattress or the user's body.

2. Description of the Related Art

Many people enjoy relaxing on a flotation device such as an inflatable air mattress or raft while floating in a swimming pool, lake, ocean or other body of water. Lying on a floating air mattress has also been found to be an excellent method of tanning one's body. Unlike a beach chair or towel on the sand, a floating air mattress or raft takes advantage of the waters therapeutic, relaxing motion. Additionally, the water provides a constant source of refreshment while also magnifying the intensity of the suns rays, creating an excellent tanning environment. Thus, a person floating on an air mattress or raft will naturally tan faster, while at the same time stay cool and refreshed by the surrounding water.

In spite of the benefits of relaxing and tanning on a flotation device, a common problem associated with this practice is the undesirable drifting due to wind, current or wave action on the surface of the water. In an attempt to eliminate this problem, inflatable air mattresses and rafts having various anchoring devices have been developed in the related art. Some of these apparatus and devices are disclosed in the following U.S. Pat. Nos.: Eggleston, 4,729,331; Martin, 4,913,672; Gunter et al, 4,775,346; and Bollant, 5,203,860. While the various flotation devices and associated anchoring apparatus disclosed in these patents may be suitable for their intended purpose, some of them require a specifically designed air mattress or raft for use in combination with the anchor. Furthermore, none of the anchoring apparatus known in the related art provide a hook means including an anchor line lock means for selectively adjusting the length of anchor line between the hook means at one end and an anchor at the opposite end. Finally, none of the anchoring devices in the related art provide a means of attaching the anchor line to one's body rather than the flotation device.

SUMMARY OF THE INVENTION

The present invention is directed to an anchoring kit for use in combination with a flotation device such as an inflatable air mattress or raft as commonly used by people for floating on the waters surface in a relaxed, reclined position. The anchoring kit includes an anchor having an outer casing, preferably made of a durable nylon mesh or other like material. A dense granular filling, such as lead pellets or sand, is filled and captivated within the outer casing to provide sufficient weight to the anchor. An anchor line of predetermined length includes a first end attached to the anchor and an opposite second free end. A hook means is slidably fitted to the anchor line and is selectively adjustable along a length thereof relative to the first and second ends. An anchor line locking means is provided on the hook means for locking the hook means in a selected, fixed position along the length of the anchor line, thereby allowing the length of anchor line between the hook means and anchor to be readily adjusted as desired or demanded due to varying depths of water.

The hook means may be secured to the flotation device using an eyelet which adheres to a surface of the flotation device. Alternatively, the hook means, along with the anchor line and anchor may be secured to the user's body using a body attachment device of the present invention. The body attachment device includes an endless cord loop formed of a braided nylon cord or like material. A pincher element is slidably fitted to the cord loop so that it pinches the loop at two points thereabout, thus defining two smaller loop portions. A first one of the loop portions is secured about the user's ankle or wrist while a second loop portion is secured to the hook means. Sliding, adjusted movement of the pincher element enlarges one of the loop portions, while reducing the size of the other loop portion. A resilient, cushioned sleeve is fitted about the first loop portion providing a comfortable contact with the wrist or ankle and preventing the cord from cutting the user's skin.

With the foregoing in mind, it is a primary object of the present invention to provide an anchoring kit for use in combination with a flotation device which is specifically designed to enable the user to readily adjust the length of anchor line between a hook means attached to the flotation device and an anchor at the opposite end while the user is in a relaxed, reclined position on the flotation device.

It is another object of the present invention to provide an anchoring kit for use in combination with a flotation device such as an inflatable air mattress or raft, including means to optionally secure the anchor line to either the flotation device or the user's body.

It is still a further object of the present invention to provide an anchoring kit which is specifically adapted for use in combination with existing inflatable air mattresses and rafts commonly available on the market.

It is yet another object of the present invention to provide an anchoring kit which is specifically structured for attachment to a user's body, thereby enabling use of the anchoring kit in combination with virtually any personal flotation device available in the water recreation and sporting goods market.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is an isolated perspective view illustrating attachment of the anchoring kit of the present invention to the user's ankle using a body attachment device of the present invention.

FIG. 2 is a perspective view illustrating attachment of the anchoring kit of the present invention to a flotation device.

FIG. 3 is a perspective view of one embodiment of an anchor associated with the anchoring kit of the present invention.

FIG. 4 is a sectional view of a pincher element of the body attachment device.

FIG. 5 is an isolated perspective view illustrating attachment of the anchoring kit to the user's wrist while lying on a flotation device.

Like reference numerals refer to like parts throughout the several views of the drawings.

DETAILED DESCRIPTION OF THE PREFERRED EMBODIMENT

Referring to the several views of the drawings, and initially FIG. 1, the anchoring kit of the present invention is generally indicated as 10. The anchoring kit 10 includes an anchor 12, which may take on a variety of shapes and configurations (as seen in FIGS. 1 and 3) and includes an outer casing 14 made of a durable material such as a woven nylon material commonly used in the scuba diving industry. The outer casing 14 includes stitching 15 along at least one edge so as to seal off an interior of the casing and captivate a dense granular filling 16 therein. In a preferred embodiment, lead pellets or a like dense granular substance is used for the filling 16. A tab or strip 18, preferably of the same material as the outer casing, is attached at opposite ends to the casing 14 of the anchor 12 forming a loop to facilitate attachment of an anchor line 20.

The anchor line 20 includes a first end 22 which is fed through the loop of the tab 18 and secured with tape 23 or other suitable means to effectively secure the end 22 of the anchor line to the tab 18 of the anchor. Alternatively, the end 22 of the anchor line 20 may be braided with a section of the anchor line spaced from the end 22 once passed through the loop of the tab 18. The anchor line 20 further includes an opposite second free end 24, whereby a length of the anchor line is defined between the opposite ends. The anchor line may be of a braided nylon or like material or, alternatively, a bungie type cord. A bungie cord would provide sufficient elasticity to absorb shock exerted on the anchor line 20 as may occur due to waves or wind pushing the flotation device 100 to which the anchor line may be attached, as seen in FIG. 2.

A hook 30 is movably attached to the anchor line 20 and includes a hook portion 31 structured to be secured to an attaching member, such as an eyelet 50 on the flotation device 100 or a body attachment device 40, as described more fully hereinafter. A closure finger 32 on the hook 30 is normally biased against a distal tip of the hook portion 31 so as to effectively captivate the attaching member on the object to which the hook is secured within the grasp of the hook portion 31. A base of the hook 34 includes a line locking means 36 for locking the hook at fixed, selected positions along a length of the anchor line. The line locking means 36 includes a catch 38 defined by a slot formed between two grasping members 39, 39' which effectively grasp the anchor line when the anchor line is wedged therebetween. In this manner, a length of the anchor line between the hook 30 and the first end 22 can be adjusted by grasping the anchor line 20 near the free end 24 and pulling outwardly away from the catch 38, thereby releasing the line from between the grasping members 39, 39'. The anchor line 20 passes through a hollow bore formed through the base 34 of the hook, opposite the catch 38 (not fully shown in the drawings for purposes of clarity). Once the anchor line 20 is unlocked from the catch 38, the hook 30 is able to slide along the length of the anchor line as the anchor line feeds through the bore in the base 34 of the hook. When the hook has been positioned at a desired location along a length of the anchor line, the anchor line is locked in the catch 38, thus preventing further movement of the hook along the anchor line.

A body attachment device 40 facilitates attachment of the hook 30 and anchor line 22 to the user's limb, such as a wrist or ankle as seen in FIGS. 1 and 5. The body attachment device 40 is structured for interconnecting attachment to the user's limb (either the ankle or wrist) and the hook so as to effectively secure the anchor line to the body of the user. Alternatively, the user may desire to simply hold on to the body attachment device rather than securing it about the ankle or wrist. The body attachment device 40 includes an endless loop cord formed of braided nylon or a like material. A pincher element 44 is movably fitted to the cord loop 42 so that it contacts two points along the loop and pinches them together so as to define two loop portions, including a first loop portion 46 and a second loop portion 48. As seen in FIG. 4, the pincher element 44 includes a button 45 which is normally urged outwardly to pinch the cord loop 42. Specifically, the button 45 includes a cylindrical stem 60 slidably fitted within a tubular body 62. Upon depressing the button 45, the stem 60 moves inwardly against biasing element 64 such that a bore 66 in the stem 60 aligns with holes 68, 68' in the tubular body. Two legs of the cord loop 42 pass through the holes 68, 68' and the bore 66. When the button 45 is pushed in, and the bore 66 and holes 68, 68' align, pincher element 44 is able to move relative to the cord loop 42, thereby enlarging either the first loop portion 46 or the second loop portion 48 (depending upon the direction of movement), while simultaneously reducing the size of the other loop portion. Accordingly, the first loop portion 46 can be sufficiently enlarged to facilitate passage over the user's foot or hand. Once fitted around the ankle or wrist, the pincher element 44 can be moved toward the ankle or wrist to effectively close and tighten the first loop portion 46 thereabout. To prevent discomfort and possible cutting of the skin, a resilient, cushioned sleeve 47 is fitted about the first loop portion 46. In a preferred embodiment, the sleeve 47 comprises a soft rubber tubing through which a portion of the cord loop 42 passes, thus substantially defining the first loop portion 46.

Referring to FIG. 3, there is shown an alternative embodiment of the anchor 12. Specifically, FIG. 3 illustrates one embodiment of the anchor 12' with an outer casing 14' having a pyramid configuration. Depending on the particular type and configuration of the bottom surface of the body of water in which the anchoring kit is being used, one particular anchor configuration may be found to be more effective than another.

Now that the invention has been described,

What is claimed is:

1. An anchoring kit for anchoring a user's body while floating on water, said anchoring kit comprising:
   an anchor including an outer casing and a dense granular filling captivated therein,
   an anchor line including a first end secured to said anchor, an opposite end zone including a second end, and a mid zone between said first end and said second end,
   body attachment means on said opposite end zone structured and disposed for attachment to a limb of the user and including a loop portion with a sliding pincher element fitted to said loop portion, said pincher element being movable to adjustably vary the size of said loop portion in order to facilitate placement and removal from about the user's limb and to provide a secure, snug fit about the limb when being attached thereto, anchor line adjustment means for selectively adjusting a length of said anchor line between said weight means and said body attachment means, and a resilient, cushioned sleeve fitted at least partially about said loop portion for contact with the user's limb.

2. An anchoring kit as recited in claim 1 wherein said outer casing of said anchor is of a rectangular pouch configuration.

3. An anchoring kit as recited in claim 1 wherein said outer casing of said anchor is of a pyramid configuration.

4. An anchoring kit as recited in claim 1 wherein said anchor line includes an elastic memory.

5. An anchoring kit for anchoring a user's body while floating on water, said anchoring kit comprising:

weight means for providing an anchor, an anchor line including a first end secured to said weight means, an opposite end zone including a second end and a mid zone between said first end and said second end, body attachment means on said opposite end zone and including a loop portion sized and disposed for receipt about a limb of the user, and further including loop closure means for selectively adjusting the size of said loop portion to provide a secure, snug fit on the user's limb, and anchor line adjustment means for selectively adjusting a length of said anchor line between said weight means and said body attachment means.

6. An anchoring kit as recited in claim 5 wherein said body attachment means includes an endless cord loop with a pincher element movably fitted thereto to adjustably vary the size of said loop.

7. An anchoring kit as recited in claim 5 wherein said body attachment means includes a sliding pincher element fitted to said loop portion and being movable to adjustably vary a size of said loop portion.

8. An anchoring kit as recited in claim 5 wherein said weight means includes an outer casing and a dense inner filling.

9. An anchoring kit as recited in claim 8 wherein said dense inner filling is a granular substance.

10. An anchoring kit as recited in claim 7 wherein said loop portion includes a resilient, cushioned sleeve thereabout for contact with the user's limb.

11. An anchoring kit as recited in claim 5 wherein said anchor line includes an elastic memory.

* * * * *